United States Patent
Andersson et al.

(10) Patent No.: US 12,489,606 B2
(45) Date of Patent: Dec. 2, 2025

(54) SYMMETRIC KEY GENERATION, AUTHENTICATION AND COMMUNICATION BETWEEN A PLURALITY OF ENTITIES IN A NETWORK

(71) Applicant: Angoka Limited, Belfast (GB)

(72) Inventors: Yuri Andersson, Belfast (GB); Shadi Razak, Belfast (GB); Konstantina Papazoglou, Belfast (GB)

(73) Assignee: Angoka Limited, Belfast (GB)

( * ) Notice: Subject to any disclaimer, the term of this patent is extended or adjusted under 35 U.S.C. 154(b) by 264 days.

(21) Appl. No.: 17/753,050

(22) PCT Filed: Aug. 22, 2020

(86) PCT No.: PCT/EP2020/073582
§ 371 (c)(1),
(2) Date: Feb. 16, 2022

(87) PCT Pub. No.: WO2021/037771
PCT Pub. Date: Mar. 4, 2021

(65) Prior Publication Data
US 2022/0278961 A1  Sep. 1, 2022

(30) Foreign Application Priority Data
Aug. 23, 2019  (GB) ..................... 1912132

(51) Int. Cl.
*H04L 9/08* (2006.01)
*H04L 9/32* (2006.01)
*H04L 9/40* (2022.01)

(52) U.S. Cl.
CPC .......... *H04L 9/0816* (2013.01); *H04L 9/0838* (2013.01); *H04L 9/085* (2013.01);
(Continued)

(58) Field of Classification Search
CPC ... H04L 63/04; H04L 63/0435; H04L 63/045; H04L 63/06; H04L 63/062; H04L 63/12; H04L 63/123; G06F 21/44
See application file for complete search history.

(56) References Cited

U.S. PATENT DOCUMENTS 6,226,383 B1 * 5/2001 Jablon ................... H04L 9/0844
380/30
10,348,498 B2 * 7/2019 Revell ..................... H04L 9/083
(Continued)

FOREIGN PATENT DOCUMENTS

CN    103560879 A    2/2014
CN    105376236 A    3/2016
(Continued)

OTHER PUBLICATIONS

International Search Report and Written Opinion in PCT/EP2020/073582 mailed Dec. 17, 2020.
(Continued)

*Primary Examiner* — Shaqueal D Wade-Wright
(74) *Attorney, Agent, or Firm* — MASCHOFF BRENNAN

(57) ABSTRACT

A method is provided for distributed symmetric key generation by a plurality of entities in a network comprising, for each entity, creating a part of the symmetric key, broadcasting the part of the symmetric key to each other entity of the plurality of entities, receiving parts of the symmetric key from each other entity of the plurality of entities, generating the symmetric key from the part of the symmetric key of the entity and at least some of the parts of the symmetric key of each other entity of the plurality of entities. An authentication method is also provided for authenticating a plurality of entities in a network

11 Claims, 2 Drawing Sheets

Figure 1:
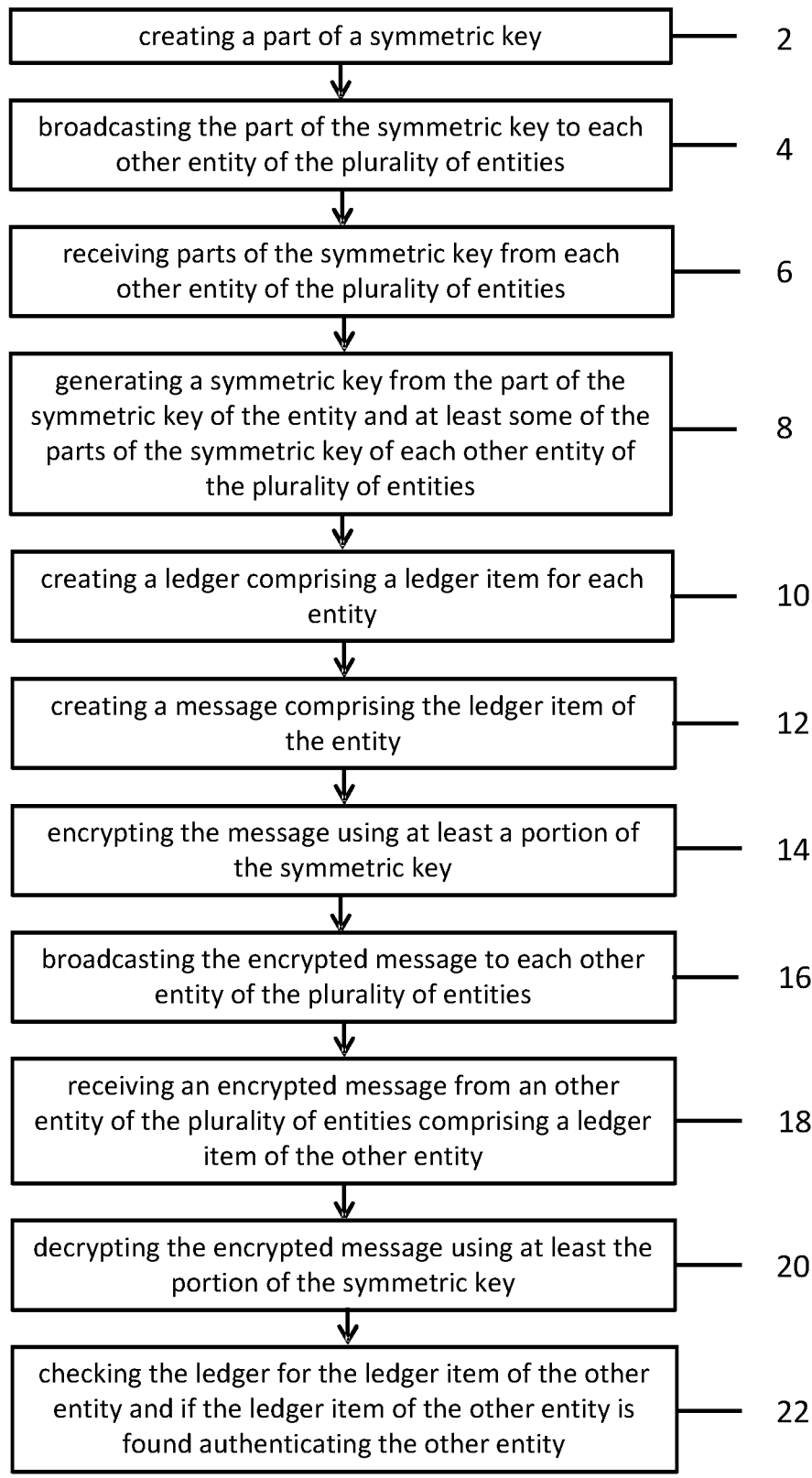

(52) U.S. Cl.
CPC .......... *H04L 9/0861* (2013.01); *H04L 9/0869* (2013.01); *H04L 9/3234* (2013.01); *H04L 63/0435* (2013.01); *H04L 63/045* (2013.01); *H04L 63/062* (2013.01); *H04L 63/123* (2013.01); *H04L 63/061* (2013.01)

(56) References Cited

U.S. PATENT DOCUMENTS

| | | | | |
|---|---|---|---|---|
| 11,387,994 | B2* | 7/2022 | Wang | .................. H04L 12/2816 |
| 2003/0026428 | A1 | 2/2003 | Loisel | |
| 2004/0078338 | A1 | 4/2004 | Ohta et al. | |
| 2017/0070340 | A1* | 3/2017 | Hibshoosh | ............ H04L 9/3026 |
| 2017/0310472 | A1 | 10/2017 | Garcia-Morchon et al. | |
| 2019/0081796 | A1 | 3/2019 | Chow et al. | |
| 2019/0342274 | A1* | 11/2019 | Olive | .................... H04L 9/3247 |
| 2019/0356482 | A1* | 11/2019 | Nix | ..................... H04W 12/041 |
| 2023/0283487 | A1* | 9/2023 | Angelo | ................. H04L 9/3278 |
| | | | | 713/168 |

FOREIGN PATENT DOCUMENTS

| | | |
|---|---|---|
| EP | 3306855 A1 | 4/2018 |
| JP | 2003-264546 A | 9/2003 |
| JP | 2014-138213 A | 7/2014 |
| WO | 2010/047356 A1 | 4/2010 |
| WO | 2016056987 A1 | 4/2016 |
| WO | 2019075156 A1 | 4/2019 |
| WO | 2019089013 A1 | 5/2019 |
| WO | 2019143404 A1 | 7/2019 |

OTHER PUBLICATIONS

Annonymous: "Symmetric-key algorithm—Wikipedia", <https://en.wikipedia.org/w/index.php?title=Symmetric-key_algorithm&oldid=724133770> Jun. 7, 2016.
Search Report in related GB1912132.6 dated Apr. 17, 2020.
Search Report in related GB2013133.0 dated Aug. 18, 2021.
Search Report in related GB2013133.0 dated Feb. 16, 2021.
Chinese Office Action mailed Apr. 21, 2023 for Chinese Application No. 202080059690.1.
UK Examination Report, as issued in connection with UK Application No. 2013133.0, dated Aug. 1, 2023, 6 pgs.
Japanese Office Action mailed Jul. 1, 2024 for Japanese Application No. 2022-512771.

* cited by examiner

SYMMETRIC KEY GENERATION, AUTHENTICATION AND COMMUNICATION BETWEEN A PLURALITY OF ENTITIES IN A NETWORK

The invention relates to symmetric key generation and authentication, encryption and communication using the key between a plurality of entities in a network, particularly but not limited to, entities in a machine-to-machine network.

Disruption of communications between entities is a well-known problem which can cause major issues. The entities may be, for example, communication nodes within vehicles, such as Electronic Control Units (ECUs). Hacking of communications between vehicle nodes has been used to take over operation of vehicles. This has been made partly possible due to the protocol used for vehicle node communication, the Controller Access Network (CAN) protocol, which is a broadcast protocol with no authentication between nodes and no communication encryption. The entities may be, for example, IoT devices etc. in a smart factory or smart homes/buildings or in industrial machines or devices in drone swarms. A methodology is therefore required to address these issues, in the above and other situations.

According to a first aspect of the invention there is provided a method for distributed symmetric key generation by a plurality of entities in a network comprising, for each entity, creating a part of the symmetric key, broadcasting the part of the symmetric key to each other entity of the plurality of entities, receiving parts of the symmetric key from each other entity of the plurality of entities, generating the symmetric key from the part of the symmetric key of the entity and at least some of the parts of the symmetric key of each other entity of the plurality of entities.

Creating the part of the symmetric key may comprise each entity generating a nonce and encrypting the nonce. Creating the nonce may comprise each entity generating a random number and encrypting the random number.

Encrypting the random number may comprise using a secret shared by each entity of the plurality of entities as an encryption key. Encrypting the random number may comprise using a mapping function of the secret as an encryption key. Encrypting the random number may comprise using a mapping function comprising any of a hash function, a block cipher function, a stream cipher function of the secret as an encryption key.

The encrypted random number of the entity may be stored in the entity.

Broadcasting the part of the symmetric key to each other entity of the plurality of entities may comprise broadcasting an encrypted random number of the entity to each other entity of the plurality of entities.

Receiving parts of the symmetric key from each other entity of the plurality of entities may comprise receiving an encrypted random number from each other entity of the plurality of entities. The encrypted random number from each other entity may be encrypted using the secret shared by each entity of the plurality of entities as an encryption key. The encrypted random number from each other entity may be encrypted using a mapping function of the secret as an encryption key. The encrypted random number from each other entity may be encrypted using a mapping function comprising any of a hash function, a block cipher function, a stream cipher function of the secret as an encryption key.

Generating the symmetric key from the part of the symmetric key of the entity and at least some of the parts of the symmetric key of each other entity of the plurality of entities may comprise using the random number of the entity and at least some of the encrypted random numbers of each other entity of the plurality of entities.

Generating the symmetric key by using the random number of the entity and at least some of the encrypted random numbers of each other entity of the plurality of entities may comprise decrypting the at least some of the encrypted random numbers of each other entity of the plurality of entities, generating a key seed by calculating a combination function of the random number of the entity and the decrypted random numbers, and generating the symmetric key by calculating a combination function of the secret shared by each entity and the key seed and calculating a mapping function of the combination of the secret shared by each entity and the key seed. The combination function may be any of an XOR function, a concatenation function, an adding function, a product function, a bit-wise operation, a convex function, an add and modulo function. The mapping function may be any of a hash function, a block cipher function, a stream cipher function.

Each entity of the plurality of entities thus generates the same symmetric key. This is used in the authentication of each entity to each other entity. The symmetric key may be a session key generated on commencement of an event and used until termination of the event.

The method may further comprise storing the symmetric key in the entity. The method may further comprise encrypting the decrypted random numbers and storing the encrypted random numbers in the entity.

The secret shared by each entity of the plurality of entities may be any of a number, a plurality of numbers, a data field, a plurality of data fields. The secret shared by each entity of the plurality of entities may be distributed to the entities on configuration of the entities. The secret shared by each entity of the plurality of entities may be distributed to the entities on resetting of the entities. The secret shared by each entity of the plurality of entities may be distributed to the entities on servicing of the entities. The secret shared by each entity of the plurality of entities may be distributed to the entities in a secure environment. When the entities are part of a vehicle, the secret shared by each entity of the plurality of entities may be distributed to the entities in a secure environment comprising a manufacturing environment of the vehicle or a servicing environment of the vehicle. When the entities are part of a smart building, the secret shared by each entity of the plurality of entities may be distributed to the entities in a secure environment comprising an installation environment of the building entities or a resetting environment of the building entities.

The secret shared by each entity of the plurality of entities may be encrypted in each entity using a fingerprint of a Physical Unclonable Function (PUF) of the entity as an encryption key. The encrypted secret of each entity may be stored in the entity.

A mapping function of the secret shared by each entity of the plurality of entities may be calculated in each entity. The mapping function of the secret may be encrypted in each entity using a fingerprint of the PUF of the entity as an encryption key. The encrypted mapping function of the secret in each entity may be stored in the entity. The mapping function may be any of a hash function, a block cipher function, a stream cipher function.

Each entity therefore stores the encrypted secret and the encrypted mapping function of the secret. These are used in the generation of the symmetric key.

According to a second aspect of the invention there is provided an authentication method for authenticating a plurality of entities in a network comprising, for each entity, creating a ledger comprising a ledger item for each entity, creating a message comprising the ledger item of the entity, encrypting the message using at least a portion of the symmetric key of the first aspect of the invention, broadcasting the encrypted message to each other entity of the plurality of entities, receiving an encrypted message from an other entity of the plurality of entities comprising a ledger item of the other entity, decrypting the encrypted message using at least the portion of the symmetric key, checking the ledger for the ledger item of the other entity, and if the ledger item of the other entity is found, authenticating the other entity.

The method for distributed symmetric key generation by a plurality of entities in a network may further comprise an authentication method for authenticating a plurality of entities in a network comprising, for each entity, creating a ledger comprising a ledger item for each entity, creating a message comprising the ledger item of the entity, encrypting the message using at least a portion of the symmetric key of the first aspect of the invention, broadcasting the encrypted message to each other entity of the plurality of entities, receiving an encrypted message from an other entity of the plurality of entities comprising a ledger item of the other entity, decrypting the encrypted message using at least the portion of the symmetric key, checking the ledger for the ledger item of the other entity, and if the ledger item of the other entity is found, authenticating the other entity.

Creating the ledger comprising a ledger item for each entity may comprise the entity receiving an identifier of the entity and an identifier of each other entity of the plurality of entities. The identifier of the entity and the identifier of each other entity of the plurality of entities may be stored in the entity.

Creating the ledger may comprise calculating as the ledger item of the entity a combination function of the identifier of the entity and at least part of the random number of the entity. Creating the ledger may comprise calculating as the ledger item of each other entity a combination function of the identifier of each other entity of the plurality of entities and at least part of the random number of each other entity of the plurality of entities. The combination function may be any of an XOR function, a concatenation function, an adding function, a product function, a bit-wise operation, a convex function, an add and modulo function.

Creating a message comprising the ledger item of the entity may comprise creating a message comprising the combination of the identifier of the entity and at least part of the random number of the entity. Creating a message comprising the ledger item of the entity may comprise creating a message comprising the combination of the identifier of the entity and at least part of the random number of the entity and at least one message field. The at least one message field may comprise an arbitration message field.

Encrypting the message using at least a portion of the symmetric key may comprise encrypting the combination of the identifier of the entity and at least part of the random number of the entity. Encrypting the message using at least a portion of the symmetric key may comprise encrypting the combination of the identifier of the entity and at least part of the random number of the entity and the at least one message field.

Broadcasting the encrypted message to each other entity of the plurality of entities may comprise broadcasting the encrypted combination of the identifier of the entity and at least part of the random number of the entity to each other entity of the plurality of entities. Broadcasting the encrypted message to each other entity of the plurality of entities may comprise broadcasting the encrypted combination of the identifier of the entity and at least part of the random number of the entity and the encrypted at least one message field to each other entity of the plurality of entities.

Receiving an encrypted message from an other entity of the plurality of entities comprising a ledger item of the other entity may comprise receiving an encrypted combination of the identifier of the other entity and at least part of the random number of the other entity. Receiving an encrypted message from an other entity of the plurality of entities comprising a ledger item of the other entity may comprise receiving an encrypted combination of the identifier of the other entity and at least part of the random number of the other entity and at least one message field.

Decrypting the encrypted message using at least the portion of the symmetric key may comprise decrypting the encrypted combination of the identifier of the other entity and at least part of the random number of the other entity. Decrypting the encrypted message using at least the portion of the symmetric key may comprise decrypting the encrypted combination of the identifier of the other entity and at least part of the random number of the other entity and the encrypted at least one message field.

Checking the authentication ledger for the ledger item of the other entity may comprise checking for the presence of the combination of the identifier of the other entity and at least part of the random number of the other entity.

On authentication of each entity, each entity may encrypt one or more data fields of messages using at least part of the symmetric key as an encryption key. By encrypting the data field confidentiality is achieved. Only messages of high importance may be encrypted.

According to a third aspect of the invention there is provided an entity symmetric key generation system of each entity of a plurality of entities in a network comprising, a processor configured to control operation of the system to create a part of a symmetric key, an input/output device configured to broadcast the part of the symmetric key to each other entity of the plurality of entities and to receive parts of the symmetric key from each other entity of the plurality of entities, the processor configured to control operation of the system to generate the symmetric key from the part of the symmetric key of the entity and at least some of the parts of the symmetric key of each other entity of the plurality of entities.

According to a fourth aspect of the invention there is provided an entity authentication system for authenticating each entity of a plurality of entities in a network comprising, a ledger comprising a ledger item for each entity, a processor configured to control operation of the system to create a message comprising the ledger item of the entity, an encryption device configured to encrypt the message using at least a portion of a symmetric key, an input/output device configured to broadcast the encrypted message to each other entity of the plurality of entities and to receive an encrypted message from at least one other entity of the plurality of entities comprising a ledger item of the other entity, the encryption device configured to decrypt the encrypted message using at least the portion of the symmetric key, the processor configured to control operation of the system to check the ledger for the ledger item of the other entity, and if the ledger item of the other entity is found, configured to authenticate the other entity.

The entity symmetric key generation system and the entity authentication system may be provided together and further comprise a memory device, a mapping function device, a random number generator, a Physical Unclonable Function, a combination function device, a clock. The entity symmetric key generation system and the entity authentication system may be comprised within the entity. The entity symmetric key generation system and the entity authentication system may be provided separately from and connected to the entity.

According to a fifth aspect of the invention there is provided an entity provided with an entity symmetric key generation system according to the third aspect of the invention and an entity authentication system according to the fourth aspect of the invention.

The entity may be an electronic control unit of a vehicle. The entity may be a road-side unit. The entity may be a unit of a smart-home network.

According to a sixth aspect of the invention there is provided a vehicle comprising a plurality of entities according to the fifth aspect of the invention in a network.

Authentication may take place between any of at least some of the entities of the vehicle, at least some of the entities of the vehicle and one or more entities of one or more further vehicles, at least some of the entities of the vehicle and a network external to the vehicle, at least some of the entities of the vehicle and one or more entities of one or more further vehicles and a network external to the vehicle.

Figure 2:
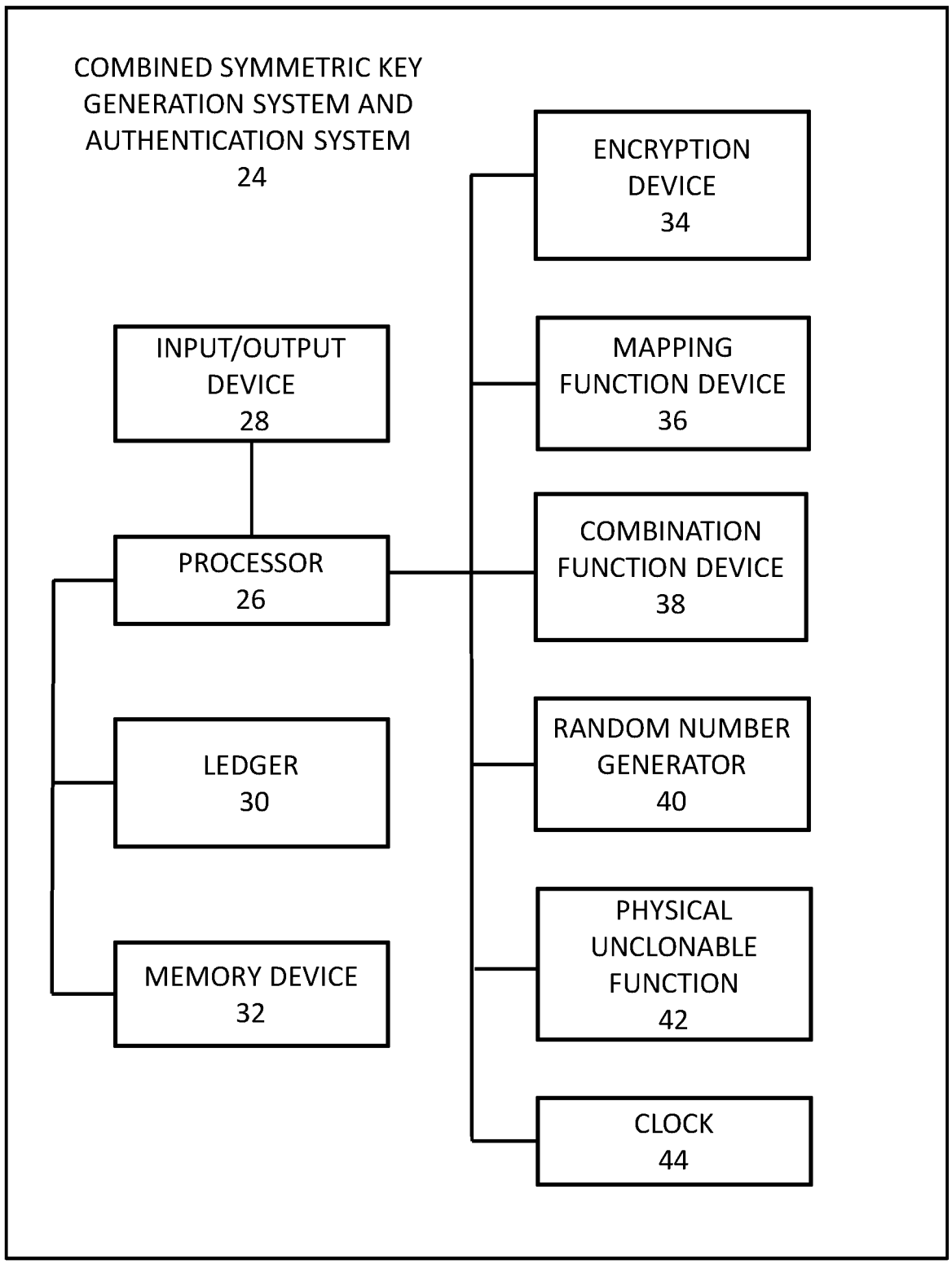

The invention will now be described by way of example only with reference to the accompanying drawings in which:

FIG. 1 is a flow diagram of the method of distributed symmetric key generation according to the first aspect of the invention and the authentication method according to the second aspect of the invention, and FIG. 2 is a schematic representation of the entity symmetric key generation system according to the third aspect of the invention and the entity authentication system according to the fourth aspect of the invention.

Referring to FIG. 1, the distributed symmetric key generation method of a plurality of entities in a network comprises, for each entity, creating a part of a symmetric key 2, broadcasting the part of the symmetric key to each other entity of the plurality of entities 4, receiving parts of the symmetric key from each other entity of the plurality of entities 6, generating a symmetric key from the part of the authentication key of the entity and at least some of the parts of the authentication key of each other entity of the plurality of entities 8.

Referring further to FIG. 1, the authentication method comprises creating a ledger comprising a ledger item for each entity 10, creating a message comprising the ledger item of the entity 12, encrypting the message using at least a portion of the symmetric key 14, broadcasting the encrypted message to each other entity of the plurality of entities 16, receiving an encrypted message from an other entity of the plurality of entities comprising a ledger item of the other entity 18, decrypting the encrypted message using at least the portion of the symmetric key 20, checking the authentication ledger for the ledger item of the other entity and if the ledger item of the other entity is found authenticating the other entity 22.

Referring to FIG. 2, a combined entity symmetric key generation system and entity authentication device 24 comprises a processor 26, an input/output device 28, an authentication ledger 30, a memory device 32, an encryption device 34, a mapping function device 36, a combination function device 38, a random number generator 40, a Physical Unclonable Function (PUF) 42 and a clock 44.

The combined entity symmetric key generation system and entity authentication system may be comprised within the entity. The combined entity symmetric key generation system and entity authentication system may be provided separately from and connected to the entity.

The ledger 30 is shown as separate from the memory device 32, but it will be appreciated that the ledger 30 may form part of the memory device 32. The memory device 32 may comprise an Electrically Erasable Programmable Read-Only (EEPROM) memory device.

In this embodiment, the encryption device 34 may perform encryption and decryption using the Advanced Encryption Standard (AES) encryption algorithm or a SPECK encryption algorithm. It will be appreciated that other algorithms may be used. In this embodiment, the mapping function device 36 is a hash function device which may use any approved SHA-256 hash algorithm. It will be appreciated that other mapping functions may be used. In this embodiment, the combination function device 38 is an XOR calculation device. It will be appreciated that other combination functions may be used.

Components of the combined entity symmetric key generation system and entity authentication system 24 are connected as shown, but it will be appreciated that other connections between the components may be made. The components may be connected by hard wired connections. The components may be provided in software, or hardware or a combination of software and hardware.

Referring to FIG. 1 and FIG. 2, the distributed symmetric key generation method and authentication method carried out by the combined entity symmetric key generation system and entity authentication system 24 will now be described. The combined entity symmetric key generation system and entity authentication system 24 is part of or connected to an entity. The entity is an entity, i, of a plurality of entities, n, in a network (not shown).

The secret S shared by each entity of the plurality of entities is distributed to the entities in a secure environment, for example a manufacturing environment of a vehicle comprising the plurality of entities. Distribution may take place on configuration of the entities.

The encryption device 34 of the combined entity symmetric key generation system and entity authentication system 24 of the entity encrypts the secret S using, for example, the AES encryption algorithm and a fingerprint $P_i$ of the PUF 42 of the combined entity symmetric key generation system and entity authentication system 24 of the entity as an encryption key:

encryption(S, $P_i$)

The encrypted secret S is stored in the memory device 32 of the combined entity symmetric key generation system and entity authentication system 24 of the entity.

The hash function device 36 of the combined entity symmetric key generation system and entity authentication system 24 of the entity uses, for example, a SHA-256 hash algorithm to calculate a hash of the secret S:

hash(S)

The encryption device 34 encrypts the hash of the secret S using, for example, the AES encryption algorithm and a re-generated fingerprint $P_i$ of the PUF 42 of the combined entity symmetric key generation system and entity authentication system 24 of the entity as an encryption key:

encryption(hash(S), $P_i$)

The encrypted hash of the secret S is stored in the memory device 32 of the combined entity symmetric key generation system and entity authentication system 24 of the entity.

Each entity therefore stores the encrypted secret S and the encrypted hash of the secret hash(S). These are used in the generation of the symmetric key.

Each time the fingerprint $P_i$ of the PUF 42 of the combined entity symmetric key generation system and entity authentication system 24 of the entity is used, the fingerprint is generated in the PUF 42 by sending a challenge to the PUF 42 which generates the fingerprint. The same challenge is used in the PUF 42 of the entity each time a fingerprint of the PUF of the entity is required. The fingerprint of the PUF is not stored, it is generated afresh each time the fingerprint is required.

The processor 26 of the combined entity symmetric key generation system and entity authentication system 24 of the entity then controls operation of the system 24 to create the part of the symmetric key comprising an encrypted random number, as follows.

The random number generator 40 of the combined entity symmetric key generation system and entity authentication system 24 of the entity first generates a random number $RN_i$ of the entity. The encryption device 34 encrypts the random number $RN_i$ of the entity using, for example, the AES encryption algorithm and a re-generated fingerprint $P_i$ of the PUF 42 of the system 24 as an encryption key. The encrypted random number of the entity is stored in the memory device 32 of the combined entity symmetric key generation system and entity system 24.

The encryption device 34 then decrypts the stored encrypted hash(S) using, for example, the AES encryption algorithm and a re-generated fingerprint $P_i$ of the PUF 42 of the system 24 as a decryption key.

decryption(encryption(hash(S), $P_i$))=hash(S)

The encryption device 34 then encrypts the random number $RN_i$ using, for example, the AES encryption algorithm and the hash(S) as an encryption key:

encryption($RN_i$, hash(S))

The encrypted random number of the entity is stored in the memory device 32 of the combined entity symmetric key generation system and entity authentication system 24 of the entity.

The input/output device 28 of the combined entity symmetric key generation system and entity authentication system 24 of the entity broadcasts the part of the symmetric key comprising the encrypted random number of the entity to each other entity of the plurality of entities.

The input/output device 28 receives parts of the symmetric key from each other entity of the plurality of entities. Each part of the symmetric key received from each other entity comprises a random number $RN_j$ generated by the other entity and encrypted using a hash of the secret S shared by all of the entities:

encryption($RN_j$, hash(S)), where j=1 . . . i−1, i+1 . . . n

The processor 26 of the combined entity symmetric key generation system and entity authentication system 24 of the entity then controls operation of the system 24 to generate the symmetric key from the part of the symmetric key of the entity and at least some of the parts of the symmetric key received from each other entity of the plurality of entities, as follows. In this embodiment, the symmetric key is generated from the part of the symmetric key of the entity and all of the parts of the symmetric key received from each other entity of the plurality of entities.

The encrypted hash(S) is retrieved from the memory device 32 and the encryption device 34 decrypts the encrypted hash(S) using, for example, the AES encryption algorithm and a re-generated fingerprint $P_i$ of the PUF 42 of the system 24 as a decryption key:

decryption(encryption(hash(S), $P_i$))=hash(S)

The encryption device 34 decrypts each of the received encrypted random numbers using, for example, the AES encryption algorithm and the hash(S) as a decryption key, to obtain the random numbers $RN_j$, j=1 . . . i−1, i+1 . . . n:

decryption(encryption($RN_j$, hash(S)))=$RN_j$

The encryption device 34 encrypts the decrypted random number $RN_j$ of each other entity using, for example, the AES encryption algorithm and a re-generated fingerprint $P_i$ of the PUF 42 of the system 24 as an encryption key. The encrypted random numbers are stored in the memory device 32 of the system 24.

The XOR calculation device 38 of the combined entity symmetric key generation system and entity authentication system 24 of the entity calculates a key seed $d_m$ comprising an XOR of the random number of the entity $RN_i$ and the decrypted random number of each other entity of the plurality of entities $RN_j$, j=1 . . . i−1, i+1 . . . n:

$d_m = RN_1 \oplus \ldots \oplus RN_n$

The encrypted secret S is retrieved from the memory device 32 and the encryption device 34 decrypts the encrypted secret S using, for example, the AES encryption algorithm and a re-generated fingerprint $P_i$ of the PUF 42 as a decryption key:

decryption(encryption(S, $P_i$))=S

The XOR calculation device 38 then calculates an XOR of the secret S and the key seed $d_m$. The hash function device 36 uses, for example, the SHA-256 hash algorithm to generate the symmetric key $k_m$ comprising a hash of the XOR of the secret S and the key seed $d_m$:

$k_m$=hash(S$\oplus d_m$)

The symmetric key $k_m$ is encrypted and stored in the memory device 32 of the combined entity symmetric key generation system and entity authentication system 24 of the entity. Each entity of the plurality of entities thus generates the same symmetric key $k_m$ which is used in the authentication of each entity with each other entity.

The symmetric key $k_m$ may be a session key i.e. generated on commencement of an event and used until termination of the event. When the entity is in a vehicle, e.g. is an Electronic Control Unit (ECU), the symmetric session key may be generated when the engine of the vehicle is turned on and used until the engine is turned off. Each time the engine is turned on a new symmetric session key is generated. New symmetric keys can be generated on demand, for example at regular intervals by broadcasting random numbers at regular intervals, or can be generated on triggering by certain events.

The combined entity symmetric key generation system and entity authentication system 24 of the entity then creates the ledger 30 comprising a ledger item for each entity, as follows.

The input/output device 28 of the system 24 receives an identifier $ID_i$ of the entity and receives an identifier $ID_j$ where $j=1 \ldots i-1, i+1 \ldots n$ of each other entity of the plurality of entities. The identifier $ID_i$ of the entity and the identifier $ID_j$ of each other entity of the plurality of entities are stored in the memory device 32 of the combined entity symmetric key generation system and entity authentication system 24 of the entity. The identifiers of the entities may be received on configuration of the system 24.

The encrypted random number of the entity is retrieved from the memory device 32 of the system 24. The encryption device 34 decrypts the encrypted random number of the entity using, for example, the AES encryption algorithm and a re-generated fingerprint $P_i$ of the PUF 42 of the system 24 as a decryption key. The encrypted random number of each other entity is retrieved from the memory device 32 of the system 24. The encryption device 34 decrypts the encrypted random number of each other entity using, for example, the AES encryption algorithm and a re-generated fingerprint $P_j$ of the PUF 42 of the system 24 as a decryption key.

The XOR calculation device 38 of the system 24 then calculates an XOR of the identifier $ID_i$ of the entity and at least part of the random number $RN_i$ of the entity:

$ID_i \oplus RN_i$

For example, when the identifier $ID_i$ of the entity comprises x bits, the XOR calculation device 38 calculates an XOR of the identifier $ID_i$ and the x leftmost bits of the random number $RN_i$ of the entity. It will be appreciated that other combination functions may be used.

The XOR calculation device 38 of the system 24 then calculates an XOR of the identifier $ID_j$ of each other entity and at least part of the random number $RN_j$ of each other entity:

$ID_j \oplus RN_j$, $j=1 \ldots i-1, i+1 \ldots n$

For example, when the identifier $ID_j$ of each other entity comprises x bits, the XOR calculation device 38 calculates an XOR of the identifier $ID_j$ and the x leftmost bits of the random number $RN_j$ of each other entity.

The ledger 30 of the combined entity symmetric key generation system and entity authentication system 24 of the entity is created by storing the XOR of the identifier $ID_i$ of the entity and at least part of the random number $RN_i$ of the entity and the XOR of the identifier $ID_j$ of each other entity and at least part of the random number $RN_j$ of each other entity in a separate record of the ledger 30.

The symmetric key $k_m$ and the ledger are then used to authenticate the entity with the other entities of the plurality of entities, as follows.

The processor 26 of the combined entity symmetric key generation system and entity authentication system 24 of the entity controls the operation of the system 24 to create a message comprising at least the ledger item of the entity i.e. comprising at least $ID_i \oplus RN_i$. The message may comprise one or more other message fields, for example an arbitration message field concatenated with the ledger item:

$ID_i \oplus RN_i //$arbitration

The encryption device 34 of the combined entity symmetric key generation system and entity authentication system 24 of the entity encrypts the message using, for example, a SPECK encryption algorithm and at least a portion of the symmetric key as an encryption key. For example, when the symmetric key comprises x bits, a portion of the symmetric key comprising any of the x leftmost bits, the x central bits, the x rightmost bits of the key may be used for encryption and decryption.

The input/output device 28 of the system 24 broadcasts the encrypted message to each other entity of the plurality of entities. The input/output device 28 receives an encrypted message from each other entity of the plurality of entities. Each message comprises a ledger item of each other entity concatenated with an arbitration message field:

$ID_j \oplus RN_j //$arbitration

The encryption device 34 of the system 24 of the entity decrypts each received encrypted message using, for example, the SPECK encryption algorithm and at least the portion of the symmetric key as a decryption key to obtain the ledger item of each other entity:

$ID_j \oplus RN_j$

The processor 26 then controls operation of the combined entity symmetric key generation system and entity authentication system 24 of the entity to check the ledger 30 for the ledger item of each other entity. When the ledger item of an other entity is found in the ledger 30, it is determined that the entity is authenticated with the other entity of the plurality of entities.

On authentication of the entity with each other entity, the entity may then send messages to the other entities. The messages may comprise one or more data fields. The encryption device 34 of the authentication system 24 of the entity encrypts the messages using, for example, the SPECK encryption algorithm and at least a portion of the symmetric key as an encryption key:

encryption(data field, $k_m$)

By encrypting the one or more data fields of the messages, confidentiality is achieved.

The input/output device 28 of the system 24 broadcasts the encrypted messages to other entities of the plurality of entities. The input/output device 28 receives encrypted messages from other entities of the plurality of entities. The encryption device 34 of the combined entity symmetric key generation system and entity authentication system 24 of the entity decrypts each received message using, for example, the SPECK encryption algorithm and the at least part of the symmetric key as a decryption key to obtain the one or more data fields of the message:

decryption(encryption(data field, $k_m$))=data field

The invention may be used for symmetric key generation, authentication and encrypted communication between any group of entities, not limited to electronic control units in vehicles, machines in industrial and home IoT networks.

The invention claimed is:

1. A method for distributed symmetric key generation by a plurality of entities in a network comprising each entity of the plurality of entities generating the same symmetric key, by:

each entity receiving a secret shared by each entity of the plurality of entities;

each entity encrypting the shared secret using an encryption algorithm and a fingerprint of the entity;

each entity decrypting the shared secret using a re-generated fingerprint of the entity creating a part of the same symmetric key using the decrypted shared secret;

each entity broadcasting the part of the same symmetric key to each other entity of the plurality of entities;

each entity receiving a part of the same symmetric key from each other entity of the plurality of entities; and each entity decrypting the shared secret using a further re-generated fingerprint of the entity and generating the same symmetric key from the part of the same symmetric key created by the entity and each part of the same symmetric key received from each other entity of the plurality of entities using the decrypted shared secret.

2. The method for distributed symmetric key generation according to claim 1 in which creating the part of the symmetric key comprises each entity generating a nonce and encrypting the nonce.

3. The method for distributed symmetric key generation according to claim 2 in which creating the nonce comprises each entity generating a random number and encrypting the random number.

4. The method for distributed symmetric key generation according to claim 3 in which encrypting the random number comprises using a secret shared by each entity of the plurality of entities as an encryption key.

5. The method for distributed symmetric key generation according to claim 4 in which broadcasting the part of the symmetric key to each other entity of the plurality of entities comprises broadcasting an encrypted random number of the entity to each other entity of the plurality of entities.

6. The method for distributed symmetric key generation according to claim 1 in which receiving a part of the same symmetric key from each other entity of the plurality of entities comprises receiving an encrypted random number from each other entity of the plurality of entities.

7. The method for distributed symmetric key generation according to claim 6 in which the encrypted random number from each other entity is encrypted using the secret shared by each entity of the plurality of entities as an encryption key.

8. The method for distributed symmetric key generation according to claim 6 in which generating the same symmetric key from the part of the same symmetric key of the entity and each part of the same symmetric key of each other entity of the plurality of entities comprises using the random number of the entity and at least some of the encrypted random numbers of each other entity of the plurality of entities.

9. The method for distributed symmetric key generation according to claim 8 in which generating the same symmetric key by using the random number of the entity and at least some of the encrypted random numbers of each other entity of the plurality of entities comprises decrypting the at least some of the encrypted random numbers of each other entity of the plurality of entities, generating a key seed by calculating a combination function of the random number of the entity and the decrypted random numbers, and generating the same symmetric key by calculating a combination function of the secret shared by each entity and the key seed and calculating a mapping function of the combination of the secret shared by each entity and the key seed.

10. An entity symmetric key generation system of each entity of a plurality of entities in a network each generating the same symmetric key, comprising:

an input/output device configured to receive a secret shared by each entity of the plurality of entities;

a processor configured to control operation of the system to encrypt the shared secret using an encryption algorithm and a fingerprint of the entity;

wherein the processor is configured to decrypt the shared secret using a re-generated fingerprint of the entity and to control operation of the system to create a part of the same symmetric key using the decrypted shared secret;

wherein the input/output device is configured to broadcast the part of the same symmetric key to each other entity of the plurality of entities and to receive a part of the same symmetric key from each other entity of the plurality of entities; and wherein the processor is configured to control operation of the system to decrypt the shared secret using a further re-generated fingerprint of the entity and generate the same symmetric key from the part of the same symmetric key of the entity and each part of the symmetric key of each other entity of the plurality of entities using the decrypted shared secret.

11. A vehicle comprising a plurality of entities, wherein each entity comprises an entity symmetric key generation system according to claim 10.

* * * * *